Sept. 6, 1938.   G. CAMILLI   2,129,524
CURRENT TRANSFORMER
Filed Oct. 31, 1936

Inventor:
Guglielmo Camilli,
by Harry E. Dunham
His Attorney.

Patented Sept. 6, 1938

2,129,524

UNITED STATES PATENT OFFICE 2,129,524

CURRENT TRANSFORMER

Guglielmo Camilli, Pittsfield, Mass., assignor to General Electric Company, a corporation of New York Application October 31, 1936, Serial No. 108,629

2 Claims. (Cl. 171—119)

My invention relates to current transformers and its general object is to provide an improved arrangement for maintaining a substantially constant ratio between the current in the primary winding of a current transformer and the current in an instrument or other load supplied by the transformer throughout the load range of the transformer. The permeability of the magnetic core and therefore the magnetizing current in the primary winding in a simple current transformer varies with the load on the transformer, the magnetizing current increasing less rapidly than the voltage across the primary winding, and for this reason the ratio between the primary and secondary currents also varies with the load. It is often very desirable that the current ratio be as nearly constant as possible under different load conditions and the present invention provides an arrangement which is effective in increasing the constancy of the current ratio and therefore the accuracy of electrical measuring instruments or other devices responsive to the secondary current of the transformer. Another object of the invention is to provide an effective arrangement for protecting the windings of a current transformer from the effects of excessively high voltages, this protective means being arranged to afford the desired protection to the windings and also to improve the constancy of the current ratio of the transformer.

Figure 1:
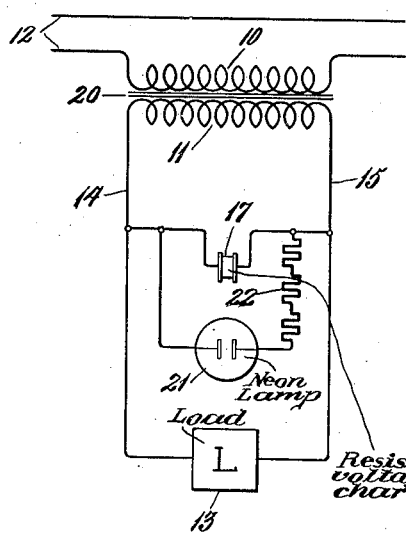
Figure 2:
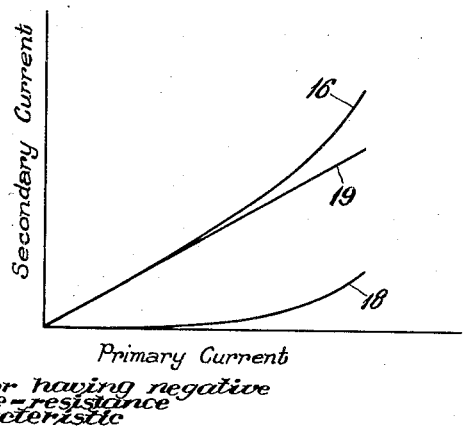

The invention will be better understood from the following description taken in connection with the accompanying drawing in which Fig. 1 is a diagrammatic view of a current transformer and its associated circuits arranged in accordance with the invention, and Fig. 2 is an explanatory curve diagram.

The current transformer indicated in Fig. 1 includes a primary winding 10 and a secondary winding 11, the primary winding 10 being connected as usual in series with one side of an electrical circuit 12. An electrical load 13 is connected by secondary leads 14 and 15 across the terminals of the secondary winding 11. The parts thus far described are those of the usual simple current transformer and the ratio between the primary and secondary currents of this transformer may be indicated by the curve 16 of Fig. 2. This is the usual form of curve for a simple current transformer and it shows that the current ratio of the transformer is not constant throughout the operating range of the transformer but that the percentage increase of the secondary current is more rapid than that of the primary current, particularly as the two currents approach their maximum values, the cause of this being that the magnetizing current in the primary winding increases less rapidly than the voltage across the primary winding.

In order to maintain a constant or at least more nearly constant ratio between the currents in the primary winding 10 and in the load 13, a noninductive resistor 17 is connected across the secondary winding 11. This resistor 17 has a negative voltage-resistance characteristic; that is, the resistance of this resistor 17 will vary inversely with the voltage applied across it. A material suitable for use in this resistor 17 is disclosed in the Karl B. McEachron Patent No. 1,822,742, issued September 8, 1931, and assigned to the General Electric Company. The resistance of the resistor 17, corresponding to low values of primary and secondary currents, should be very high so that its effect on the current in the load 13 will be negligible. As the current in the load 13 increases in response to an increasing current in the primary winding 10, the voltage applied by the secondary winding 11 across the load 13 and therefore across the resistor 17 must also be increasing so that the resistance of the resistor 17 will gradually decrease and more and more of the current from the secondary winding 11 will flow through this resistor 17, as indicated by the curve 18 in Fig. 2. The current in the load 13 is of course equal to the difference between the currents in the secondary winding 11 and in the resistor 17. If the negative voltage-resistance characteristic of the resistor 17 is properly proportioned, then the ratio between the current in the primary winding 10 of the transformer and the current in the load 13 will be substantially constant as indicated by the straight line curve 19 of Fig. 2. At least, it will not be difficult to select a resistor 17 having such negative voltage-resistance characteristic that the ratio between the primary and load currents will be more nearly constant than that between the two currents in the primary and the secondary windings of the transformer.

It is desirable that the resistor 17 be so proportioned that it may protect the current transformer by preventing the occurrence of excessive voltages in its windings. If the secondary circuit of a current transformer is left open by accident or otherwise, then the voltage of the secondary winding will increase to such values as may injure the transformer insulation. The characteristics of the resistor 17 are such, however, that as the voltage of the secondary winding 11 increases, the resistance of the resistor 17 will decrease and become more and more effective in limiting the voltage across the secondary winding. The resistor 17 should be so proportioned as to carry such current indefinitely without injury. A more serious condition may arise as a result of some trouble such as a short circuit somewhere in the primary circuit 12. Such trouble may increase the current in the primary winding 10 until the magnetic core 20 of the current transformer is saturated and under these conditions the current in the secondary winding 11 would tend to increase to very high and dangerous values. The resistor 17 is preferably so proportioned as to carry this secondary current indefinitely without injury and thus act effectively to minimize the voltage of the secondary winding.

A gaseous discharge device such as a neon lamp 21 is connected in series with a high resistance 22 across the resistor 17. This lamp 21 should be so proportioned as to break down and thus act as a signal light only when the voltage across the resistor 17 and therefore the voltage of the secondary winding 11 exceeds its maximum normal value corresponding to the maximum load capacity of the transformer. The resistance 22 may be provided to limit the current through the neon lamp 21 and thus prevent injury to the lamp in case of excessive and prolonged voltage and current conditions in the windings of the transformer.

What I claim as new and desire to secure by Letters Patent of the United States is:

1. A current transformer including a magnetic core, a primary winding for magnetizing the core, a secondary winding for supplying current to a load, the magnetizing current in said primary winding increasing less rapidly than the voltage across the primary winding whereby the ratio between the current in the primary and secondary windings of the transformer varies for different current values, and a resistor having a negative voltage-resistance characteristic connected across the secondary winding of the transformer, said resistor being proportioned to compensate for the variation in the magnetizing current to reduce the variation in ratio between the current in the primary and the current in the load.

2. A current transformer including a magnetic core, a primary winding for magnetizing the core, a secondary winding for supplying current to a load, the magnetizing current in said primary winding increasing less rapidly than the voltage across the primary winding, whereby the ratio between the currents in the primary and secondary windings of the transformer varies for different current values, a load connected across the secondary winding of the transformer, and a resistor having a negative voltage-resistance characteristic also connected across the secondary winding of the transformer, said resistor being proportioned to compensate for the variation in said magnetizing current to reduce the variation in ratio between the current in the primary winding and the current in the load.

GUGLIELMO CAMILLI.